United States Patent
Lee et al.

(10) Patent No.: US 11,089,279 B2
(45) Date of Patent: Aug. 10, 2021

(54) 3D IMAGE PROCESSING METHOD, CAMERA DEVICE, AND NON-TRANSITORY COMPUTER READABLE STORAGE MEDIUM

(71) Applicant: HTC Corporation, Taoyuan (TW)

(72) Inventors: Ching-Hao Lee, Taoyuan (TW); Chia-Chu Ho, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/212,600

(22) Filed: Dec. 6, 2018

(65) Prior Publication Data

US 2020/0186774 A1    Jun. 11, 2020

(51) Int. Cl.
*H04N 13/128* (2018.01)
*G06T 7/50* (2017.01)
*H04N 5/232* (2006.01)

(52) U.S. Cl.
CPC ............ *H04N 13/128* (2018.05); *G06T 7/50* (2017.01); *H04N 5/23229* (2013.01)

(58) Field of Classification Search
CPC ......... G03B 35/00–26; H04N 13/0296; H04N 13/239; H04N 13/332; H04N 5/232
USPC ....... 382/154; 356/12–14, 57–65, 5.01–5.08; 348/46–50
See application file for complete search history.

(56) References Cited

U.S. PATENT DOCUMENTS

| | | | | |
|---|---|---|---|---|
| 2002/0196415 A1* | 12/2002 | Shiratani | ................ | G01B 11/25 353/31 |
| 2008/0123156 A1* | 5/2008 | Miyata | .................... | H04N 1/58 358/450 |
| 2008/0231740 A1* | 9/2008 | McIntyre | ............. | H04N 5/2251 348/333.01 |
| 2010/0149210 A1* | 6/2010 | Matsunaga | ............... | G06T 7/11 345/625 |
| 2010/0194919 A1* | 8/2010 | Ishii | ..................... | H04N 5/2354 348/224.1 |
| 2011/0090318 A1* | 4/2011 | Chen | .................... | H04N 13/261 348/50 |
| 2011/0255775 A1* | 10/2011 | McNamer | .......... | H04N 5/23293 382/154 |
| 2012/0098935 A1* | 4/2012 | Schmidt | ................. | G01S 17/89 348/46 |
| 2012/0106791 A1* | 5/2012 | Lim | ........................ | G06K 9/34 382/103 |

(Continued)

FOREIGN PATENT DOCUMENTS

CN      101610421 A      12/2009
CN      102239506 A      11/2011

(Continued)

OTHER PUBLICATIONS

Corresponding Chinese office action dated Mar. 1, 2021.

*Primary Examiner* — Xi Wang
(74) *Attorney, Agent, or Firm* — CKC & Partners Co., LLC (57) ABSTRACT

A 3D image processing method includes: capturing, by a camera device, a first image with a first camera and a second image with a second camera; transmitting, by the camera device, the first image to an electronic device; transmitting, by the camera device, one or more object images in the second image to the electronic device based on a depth information of the second image; and rebuilding, by the electronic device, a third image by combining the one or more object images and the first image.

12 Claims, 8 Drawing Sheets

(56) References Cited

U.S. PATENT DOCUMENTS

| | | | | |
|---|---|---|---|---|
| 2012/0242791 A1* | 9/2012 | Saito | ............... | H04N 13/10 |
| | | | | 348/43 |
| 2012/0293407 A1* | 11/2012 | Lee | ............... | G02B 27/017 |
| | | | | 345/156 |
| 2014/0071313 A1* | 3/2014 | Hiasa | ............... | H04N 5/21 |
| | | | | 348/231.99 |
| 2015/0356738 A1* | 12/2015 | Yoon | ............... | H04N 5/2258 |
| | | | | 348/47 |
| 2016/0071322 A1* | 3/2016 | Nishiyama | ............... | G06T 19/00 |
| | | | | 345/632 |
| 2016/0337587 A1* | 11/2016 | Chou | ............... | H04N 5/23245 |
| 2018/0139431 A1* | 5/2018 | Simek | ............... | H04N 5/2258 |
| 2018/0249148 A1* | 8/2018 | Roulet | ............... | H04N 5/23238 |

FOREIGN PATENT DOCUMENTS

| | | |
|---|---|---|
| CN | 104427291 A | 3/2015 |
| CN | 106210504 A | 12/2016 |
| WO | 2018150933 A1 | 8/2018 |

* cited by examiner

Fig. 5C

3D IMAGE PROCESSING METHOD, CAMERA DEVICE, AND NON-TRANSITORY COMPUTER READABLE STORAGE MEDIUM

BACKGROUND

Technical Field

The present disclosure relates to an electronic device and an image processing method. More particularly, the present disclosure relates to a 3D image processing method applying parallax effect.

Description of Related Art

In some 3D video streaming applications, a user receives two different images from two eyes correspondingly. Due to the parallax effect, the user may feel the distances/depths to the objects in the image are different, and therefore the 3D effect is achieved.

SUMMARY

One aspect of the present disclosure is related to a 3D image processing method. In accordance with some embodiments of the present disclosure, the 3D image processing method includes: capturing, by a camera device, a first image with a first camera and a second image with a second camera; transmitting, by the camera device, the first image to an electronic device; transmitting, by the camera device, one or more object images in the second image to the electronic device based on a depth information of the second image; and rebuilding, by the electronic device, a third image by combining the one or more object images and the first image.

Another aspect of the present disclosure is related to an electronic device. In accordance with some embodiments of the present disclosure, the electronic device includes a first camera and a second camera, a processing circuit, a communicating circuit electrically connected to the processing circuit and configured to communicate the camera device with an electronic device, a memory electrically connected to the processing circuit, and one or more programs. The one or more programs are stored in the memory and configured to be executed by the processing circuit. The one or more programs including instructions for: controlling the first camera to capture a first image and controlling the second camera to capture a second image; controlling the communicating circuit to transmit the first image to the electronic device; controlling the communicating circuit to transmit one or more object images in the second image to the electronic device based on a depth information of the second image. A third image is rebuilt by the electronic device by combining the one or more object images and the first image.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling a first camera to capture a first image and controlling a second camera to capture a second image; controlling a communicating circuit to transmit the first image to a electronic device; controlling the communicating circuit to transmit one or more object images in the second image to the electronic device based on a depth information of the second image. A third image is rebuilt by the electronic device by combining the one or more object images and the first image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
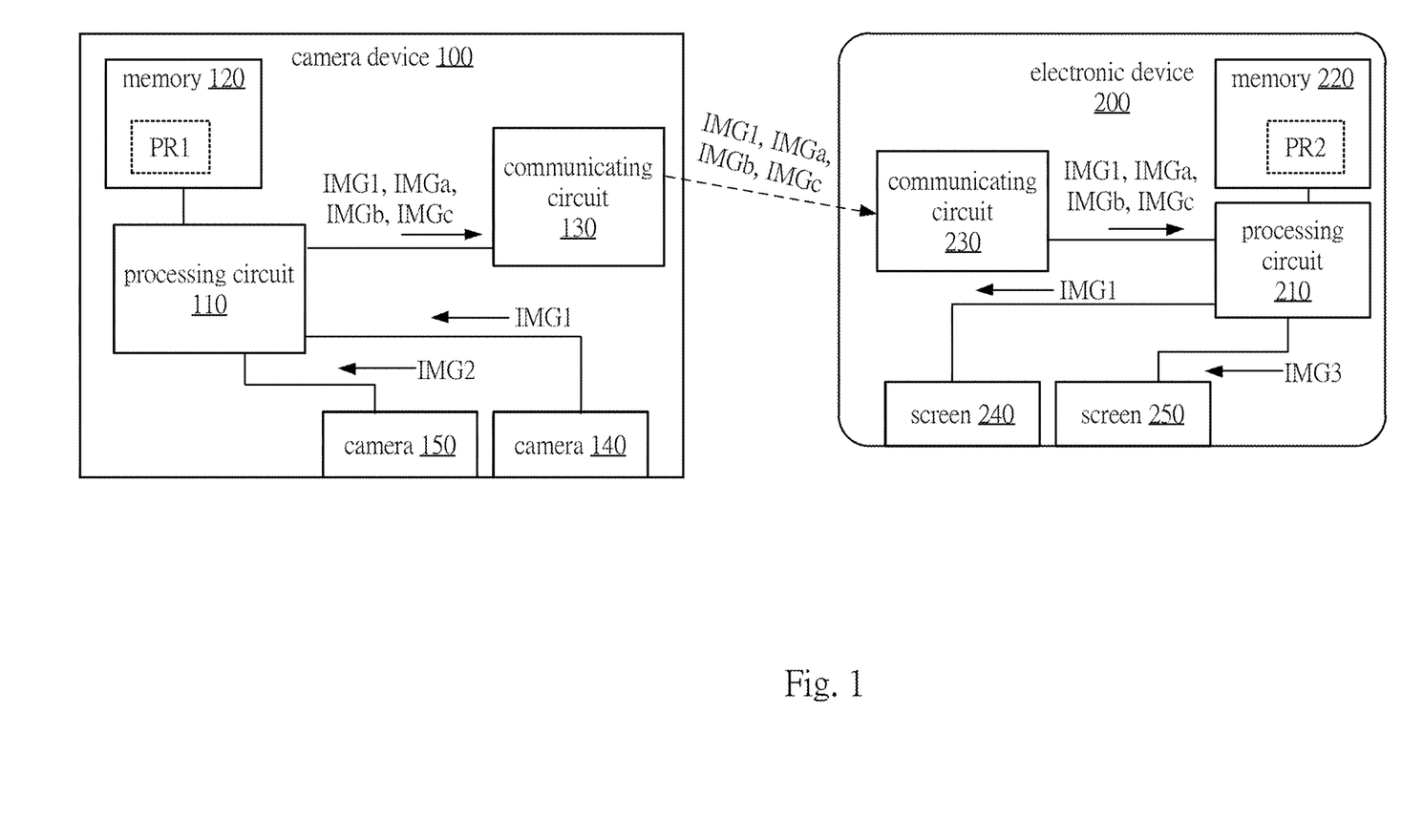
FIG. 1 is a schematic block diagram illustrating a communication scenario between a camera device and an electronic device in accordance with some embodiments of the present disclosure.

Reference is made to FIG. 1. FIG. 1 is a schematic block diagram illustrating a communication scenario between a camera device 100 and an electronic device 200 in accordance with some embodiments of the present disclosure. The camera device 100 may be configured to capture one or more first images IMG1 with the camera 140 and one or more second images IMG2 with the camera 150. The images obtain from different lens with different viewing angle may be compressed and transmitted and displayed in two different screens 240 and 250 of the electronic device 200. Since the screens 240 and 250 respectively correspond to two eyes of a user, the parallax effect between the images for two eyes may bring a 3D image for the user who wears the electronic device 200.

For example, in some embodiments, the camera device 100 may capture first images IMG1 and second images IMG2 with 2K pixels and 60 frames per second. The raw data obtained by the camera device is about 3.6 Gbps, in which after a 10-time compression, the data transmitted to the electronic device 200 is about 360 Mbps.

In some embodiments, the electronic device 200, which includes two displaying regions to display the images for the two eyes at the same time, may be applied in a virtual reality (VR)/mixed reality (MR)/augmented reality (AR) system. For example, the electronic device 200 may be realized by, a standalone head mounted device (HMD) or VIVE HMD. In some other embodiments, the electronic device 200 may also be a smartphone device, a tablet, or any other portable electronic devices having wireless communication ability to receive image data from the camera device 100. In detail, the standalone HMD may handle such as processing location data of position and rotation, graph processing or others data calculation.

As shown in FIG. 1, the camera device 100 and the electronic device 200 respectively includes processing circuits 110, 210, memories 120, 220, and communicating circuits 130, 230. The camera device 100 further includes cameras 140 and 150. The electronic device 200 further includes screens 240 and 250.

One or more programs PR1 and PR2 are respectively stored in the memories 120, 220 and configured to be executed by the processing circuits 110, 210, in order to execute and control the communication between the camera device 100 and the electronic device 200. In addition, the one or more programs PR1, PR2 are configured to be executed by the processing circuits 110, 210 in order to execute a 3D image processing method, in which operations of the 3D image processing method will be discussed in following paragraphs.

In some embodiments, the processing circuits 110, 210 can be realized by, for example, one or more processors, such as central processors and/or microprocessors, but are not limited in this regard. In some embodiments, the memories 120, 220 respectively include one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In structural, the memories 120, 220 are respectively electrically connected to the processing circuits 110, 210. The communicating circuits 130, 230 are respectively electrically connected to the processing circuits 110, 210 and configured to communicate the camera device 100 with the electronic device 200 by co-operation. In some embodiments, the communicating circuits 130, 230 include one or more radio frequency module (RF module) complying with a defined protocol for RF communications, such as Wifi, and used to transmit and/or receive radio signals between two devices. For example, the communicating circuits 130, 230 may incorporate a printed circuit board, one or more transmit or receive circuits, one or more antenna units, and serial interface for communication to the processing circuits 110, 210. One skilled in the art can understand how to implement the communicating circuits 130, 230, and thus further explanations are omitted herein for the sake of brevity.

Figure 2:
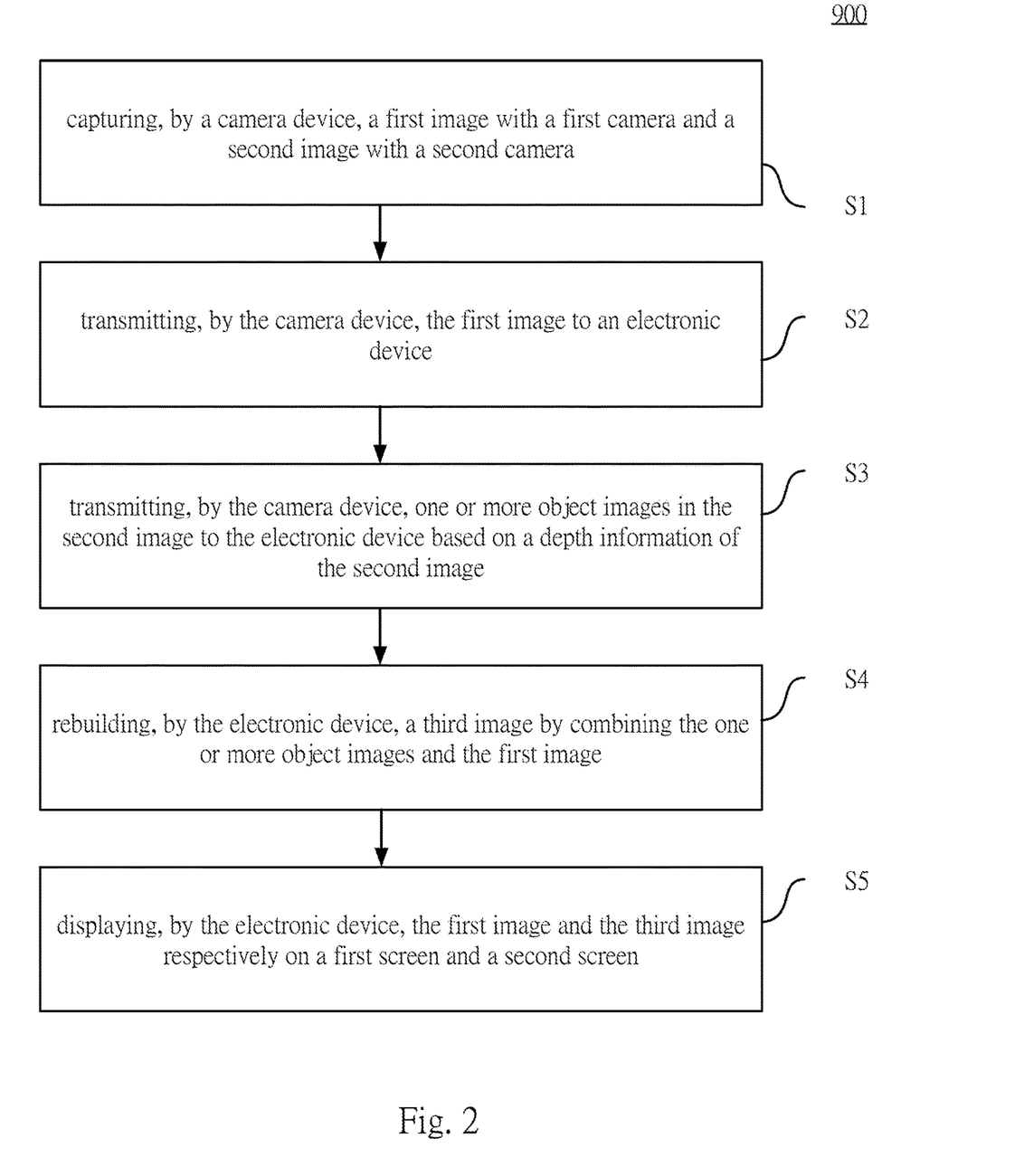
FIG. 2 is a flowchart illustrating the 3D image processing method in accordance with some embodiments of the present disclosure.

The detailed operation of the camera device 100 and the electronic device 200 will be discussed in accompanying with the embodiments shown in FIG. 2. FIG. 2 is a flowchart illustrating the 3D image processing method 900 in accordance with some embodiments of the present disclosure. It should be noted that the 3D image processing method 900 can be applied to an camera device having a structure that is the same as or similar to the structure of the camera device 100 shown in FIG. 1. To simplify the description below, the embodiments shown in FIG. 1 will be used as an example to describe the 3D image processing method 900 according to some embodiments of the present disclosure. However, the present disclosure is not limited to application to the embodiments shown in FIG. 1.

As shown in FIG. 2, the 3D image processing method 900 includes operations S1, S2, S3, S4, and S5. In operation S1, the processing circuit 110 is configured to control the camera 140 to capture a first image IMG1 and control the camera 150 to capture a second image IMG2.

In operation S2, the processing circuit 110 is configured to control the communicating circuit 130 to transmit the first image IMG1 to the electronic device 200.

In operation S3, the processing circuit 110 is configured to control the communicating circuit 130 to transmit one or more object images in the second image IMG2 to the electronic device 200 based on a depth information of the second image IMG2.

Figure 3A:
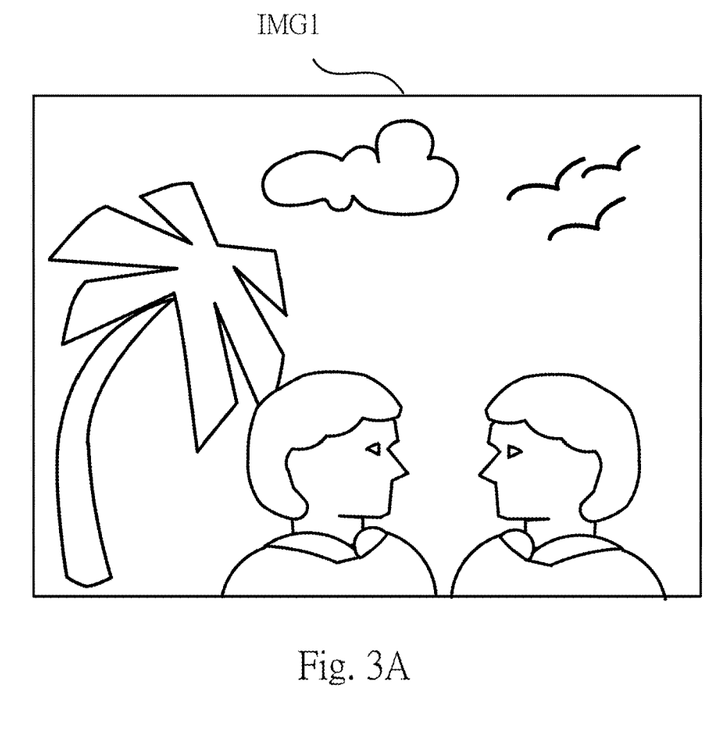
FIG. 3A and FIG. 3B are diagrams illustrating the first image and the second image according to some embodiments of the present disclosure.
Figure 3B:
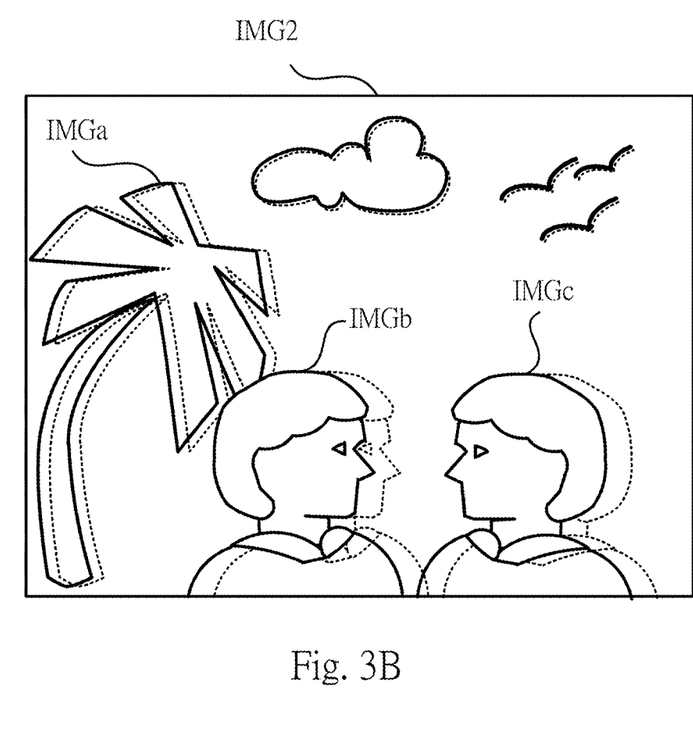
Figure 3C:
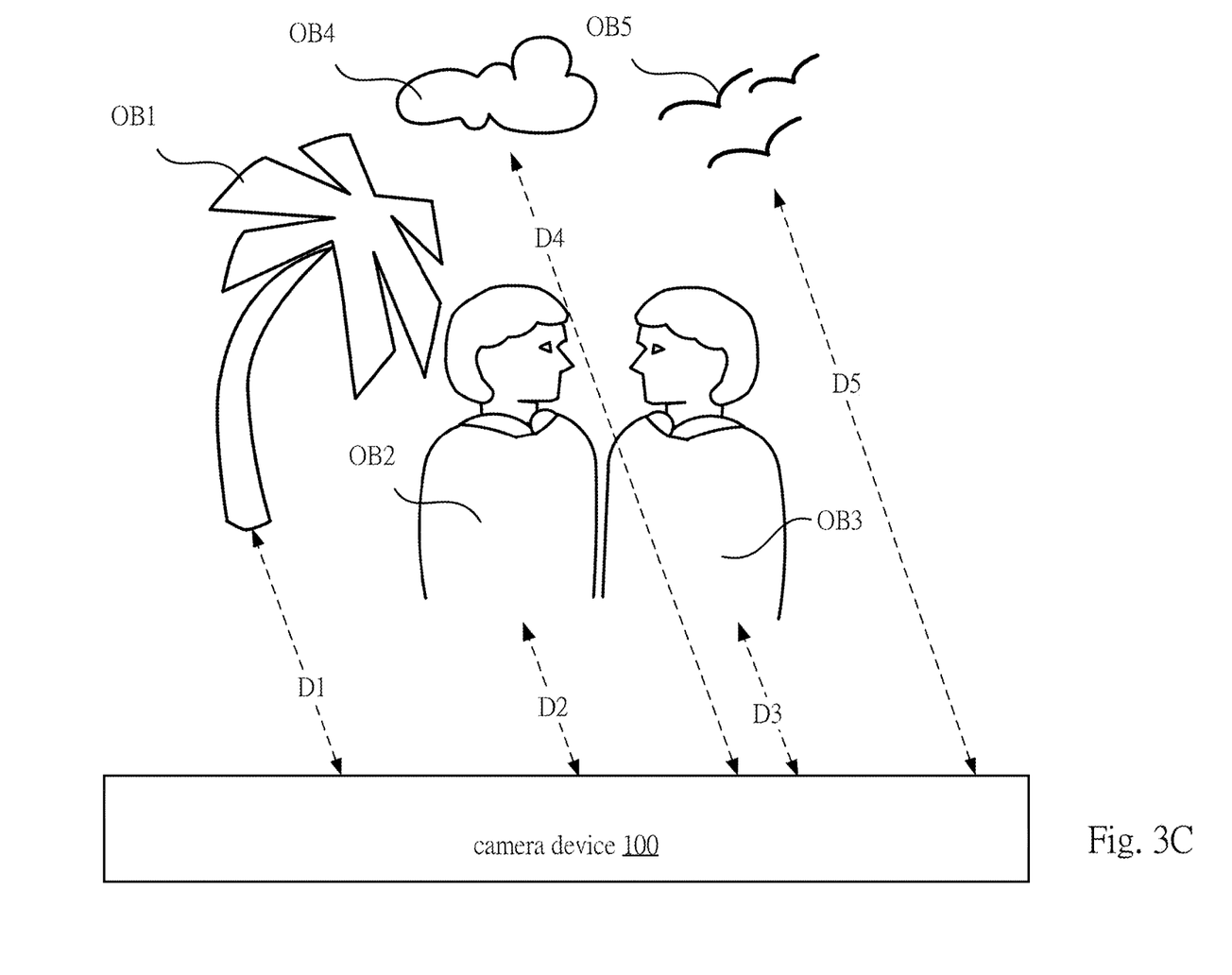
FIG. 3C is a diagram illustrating the scene of the first image and the second image according to some embodiments of the present disclosure.

For better understanding, reference is made to FIG. 3A, FIG. 3B and FIG. 3C. FIG. 3A and FIG. 3B are diagrams illustrating the first image IMG1 and the second image IMG2 according to some embodiments of the present disclosure. FIG. 3C is a diagram illustrating the scene of the first image IMG1 and the second image IMG2 according to some embodiments of the present disclosure.

As shown in FIG. 3A-FIG. 3C, objects OB1~OB65 in the real world are captured in the first image IMG1 and the second image IMG2. Since the corresponding distances D1~D5 between the objects OB1~OB5 to the camera device 100 are different, displacements or differences in the positions of the objects OB1~OB5 viewed in the first image IMG1 and in the second image IMG2 along two different lines of sight are also different.

Specifically, for a relatively near object, such as the object OB1 (e.g., the palm tree), the difference viewed in the two images is greater than the difference of a relatively far object, such as the object OB5 (e.g., the birds), viewed in the two images. In addition, on the condition that the object is away from the camera device 100, the difference of the positions of the object in the two images is small and thus negligible for human eyes. Alternatively stated, there is no need to transmit the whole images IMG1 and IMG2, since a part of the two images (e.g., the background region) are substantially the same, in which the difference of the images are negligible.

Accordingly, the camera device 100 may transmit the whole image IMG1, and one or more object images IMGa, IMGb, IMGc in the second image IMG2 to the electronic device 200 based on a depth information of the second image IMG2. Thus, only part of the second image IMG2 is transmitted, and the amount of data that enters and goes through the wireless transmission system may be reduced. Alternatively stated, the throughput of the network is reduced, and the latency of the data transmission is reduced accordingly. The camera device 100 and the electronic device 200 may thus be applied in various applications which require a low latency, such as a livestream/real-time broadcast or other real-time applications.

Specifically, in some embodiments, the camera device 100 may identify the distance D1~D5 of the objects OB1-OB5 in the second image IMG2 based on the depth information of the second image IMG2, and transmit object images IMGa, IMGb, IMGc to the electronic device 200 on the condition that the corresponding objects OB1, OB2 and OB3 are near to the camera device 100.

Figure 4:
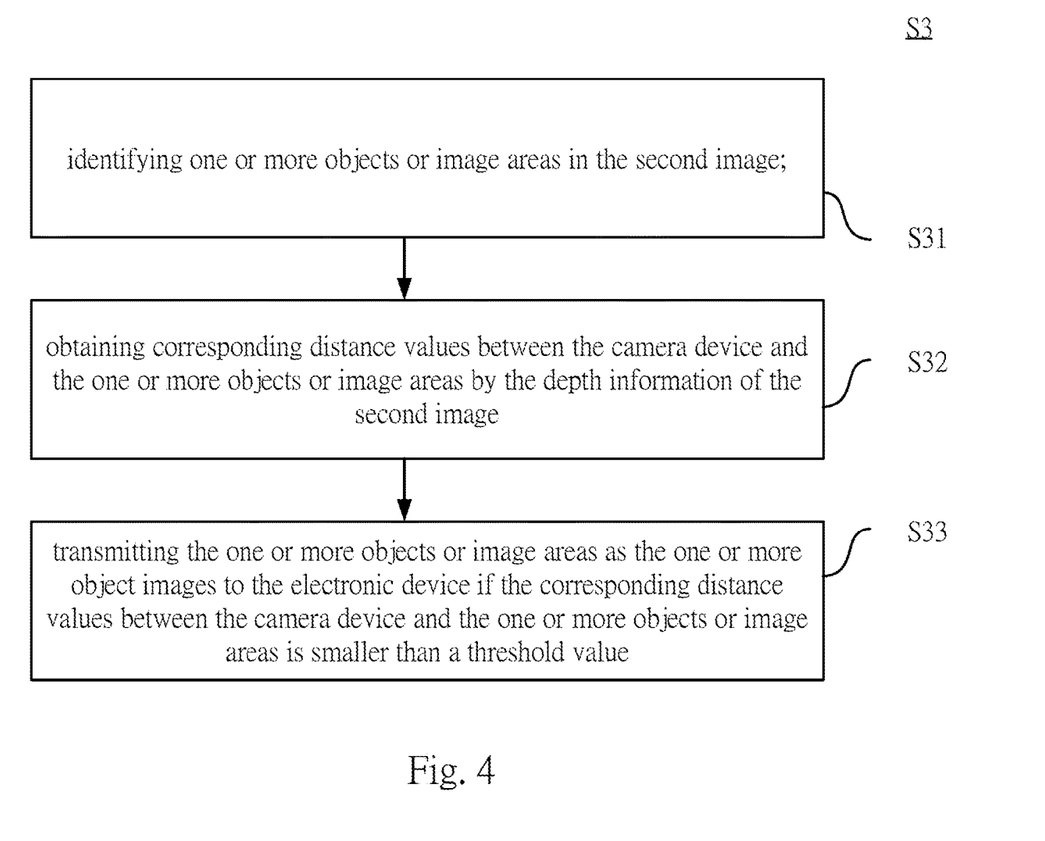
FIG. 4 is a flowchart illustrating the detailed operation in accordance with some embodiments of the present disclosure.

Reference is made to FIG. 4. FIG. 4 is a flowchart illustrating the detailed operation S3 in accordance with some embodiments of the present disclosure. As shown in FIG. 4, the operation S3 includes operations S31, S32 and S33. In the operation S31, the processing circuit 110 is configured to identify one or more objects OB1-OB5 or image areas in the second image IMG2.

In the operation S32, the processing circuit 110 is configured to obtain corresponding distance values D1-D5 between the camera device 100 and the one or more objects OB1-OB5 or image areas by the depth information of the second image IMG2.

In the operation S33, the processing circuit 110 is configured to control the communicating circuit 130 to transmit the one or more objects OB1-OB3 or image areas as the one or more object images IMGa, IMGb, and IMGc to the electronic device 200 if the corresponding distance values D1, D2, and D3 between the camera device 100 and the one or more objects OB1-OB3 or image areas are smaller than a threshold value. In some embodiment, the threshold value may be configured as about 1.5 meters, but the present disclosure is not limited thereto. For example, in some other embodiments, the threshold value may be configured as about 10 meters. The threshold value may be determined according to the actual requirements of the applications. For example, for an application (e.g., a design software for 3D model, a game software about a realistic flight experience) requires higher accuracy and more details in the 3D effect, the threshold value may be configured to be relatively lower, such as 0.5 meter to 3 meters. In another example, for application requires a fast response and a high frame rate, the threshold value may be configured to be relatively higher, such as 5 meters to 20 meters.

Thus, for the objects OB4 and OB5 having distances greater than the threshold value and the background area of the scene, only the first image IMG1 is transmitted to the electronic device 200. On the other hand, for the objects OB1-OB3 having distances smaller than the threshold value, two images are provided to the electronic device 200 in order to produce a 3D effect.

Thus, in the operation S4, the processing circuit 210 in the electronic device 200 may be configured to rebuild a third image IMG3 by combining the one or more object images IMGa, IMGb, and IMGc and the first image IMG1. Specifically, in some embodiments, the processing circuit 210 may be configured to replace corresponding pixels in the first image IMG1 with corresponding pixels of the one or more object images IMGa, IMGb, and IMGc.

Finally, in the operation S5, the processing circuit 210 may be configured to control the screens 240 and 250 to display the first image IMG1 and the third image IMG3 respectively on the first screen 240 and the second screen 250. Thus, the user wearing the electronic device 200 may see a 3D image by the parallax effect.

In various embodiments, the depth information of the second image IMG2 may be obtained by different approaches. For example, stereo vision, structured light (also known as light coding) and Time of Flight (ToF) may be applied individually or in combination in the 3D image processing method 900 in order to obtain the depth information of the second image IMG2.

Figure 5A:
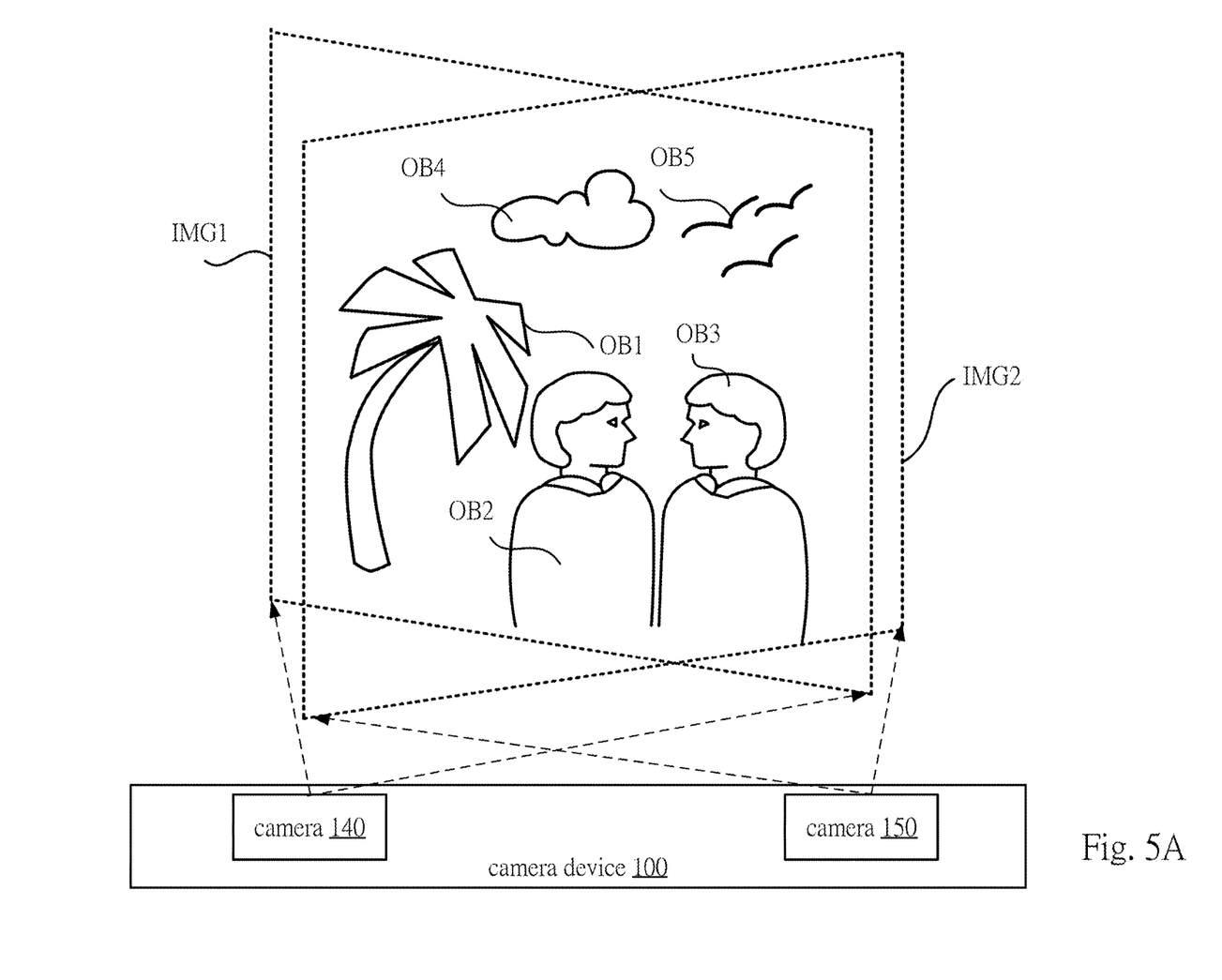
FIG. 5A-FIG. 5C are operation diagrams illustrating the 3D image processing method 900 applying corresponding methods to obtain the depth information of the second image.

Reference is made to FIG. 5A. FIG. 5A is an operation diagram illustrating the 3D image processing method 900 which applies a stereo vision method to obtain the depth information of the second image IMG2.

As illustratively shown in FIG. 5A, the stereo vision method includes comparing corresponding pixels in the first image IMG1 and in the second image IMG2 to evaluate the depth information of the second image IMG2. Specifically, as mentioned in the above paragraphs, based on the trigonometric parallax, a nearby object viewed from two different cameras 140 and 150 will appear to move with respect to a more distant object/background. Thus, by comparing the differences of the pixels in the first image IMG1 and in the second image IMG2 and measuring the amount of the shift of the position of the objects OB1-OB5, the distance to the objects OB1-OB5 may be respectively calculated. Accordingly, the depth information may be evaluated based on the trigonometric algorithm.

Figure 5B:
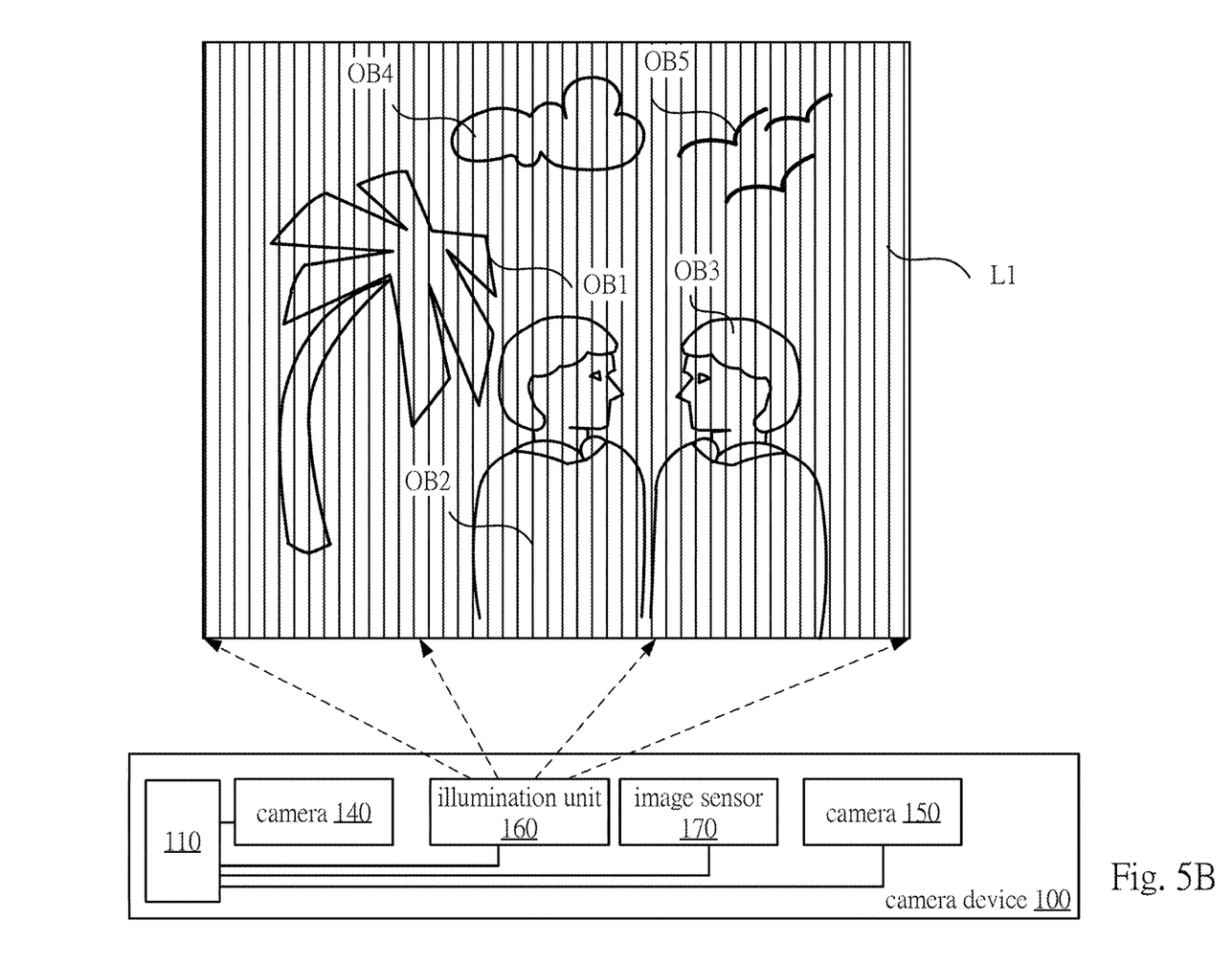

Reference is made to FIG. 5B. FIG. 5B is an operation diagram illustrating the 3D image processing method 900 which applies a structured light method to obtain the depth information of the second image IMG2.

As shown in FIG. 5B, in some embodiments, the camera device 100 further includes an illumination unit 160 and an image sensor 170, which are both electrically connected to the processing circuit 110. For example, the illumination unit 160 may be realized by an infrared light-emitting diode (IR LED) module or an infrared laser (IR laser) module. The image sensor 170 may be realized by an IR camera module. By the operations of the illumination unit 160 and the image sensor 170, the camera device 100 may operate as a depth camera and receive the depth information of the objects OB1-OB5.

In some embodiments, the structured light method includes following steps: projecting, by the Illumination unit 160, a light L1 with an encoded pattern to one or more objects OB1-OB5, capturing, by the image sensor 170, a light coding on the one or more objects, and comparing the light coding with the encoded pattern to evaluate the depth information of the second image IMG2.

For example, as illustratively shown in FIG. 5B, the Illumination unit 160 may projector the light L1 with an irregular pattern of dots with the wavelength of about 700 nm to about 1 mm, which is invisible to humans. This pattern is projected into the whole space and to the objects OB1-OB5. In some embodiments, the Illumination unit 160 includes a diffractive optical element, such that the light L1 is diffracted to form the irregular pattern of dots when the infrared light is generated.

The image sensor 170 is configured to capture and record the infrared light projected on the objects OB1-OB5. In some embodiments, the image sensor 170 includes multiple CMOS sensors configured to detect the infrared light reflected from the objects OB1-OB5. Accordingly, the intensities of the infrared light may be captured by the image sensor 170.

The light coding in the captured image is compared with the encoded pattern of the projected light, and an offset or a disparity between the projected pattern and the recorded light coding exists due to the distance of the objects OB1-OB5. Similarly, by applying triangulation methods, the distance of the objects OB1-OB5 and the information of the second image IMG2 may be calculated correspondingly.

Figure 5C:
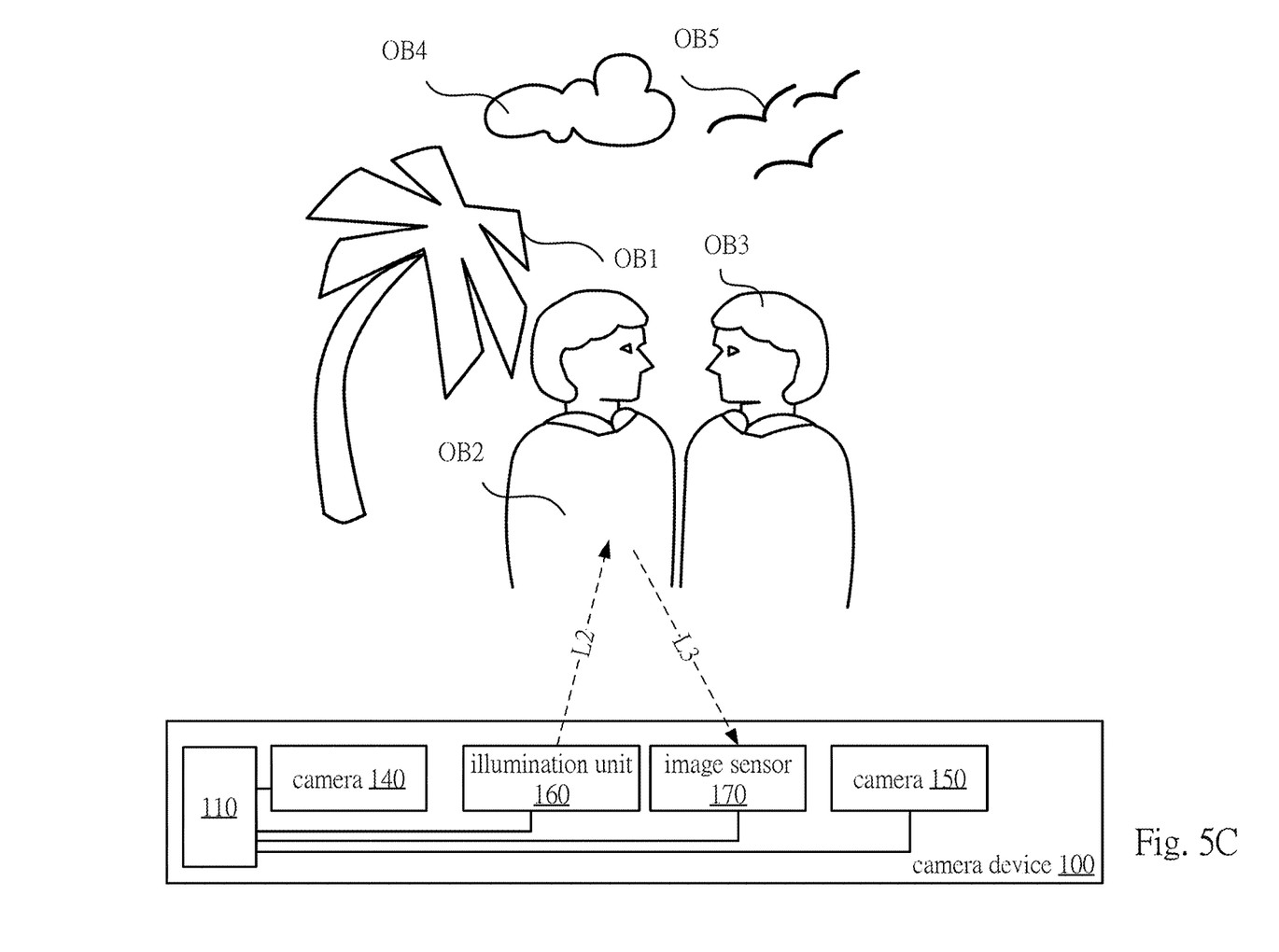

Reference is made to FIG. 5C. FIG. 5C is an operation diagram illustrating the 3D image processing method 900 which applies a time of flight method to obtain the depth information of the second image IMG2.

As shown in FIG. 5C, in some embodiments, the camera device 100 also includes an illumination unit 160 and an image sensor 170. Similarly, the illumination unit 160 may be realized by an infrared light-emitting diode (IR LED) module or an infrared laser (IR laser) module. The image sensor 170 may be realized by an IR camera module. By the operations of the illumination unit 160 and the image sensor 170, the camera device 100 may operate as a depth camera and receive the depth information of the objects OB1-OB5.

In some embodiments, the time of flight method includes following steps: projecting, by the illumination unit 160, the light L2 to one or more objects; capturing, by the image sensor 170, the light L3 reflected from the objects OB1-OB5; and measuring, by the image sensor 170, travelling time of the light from the illumination unit 160 to the objects OB1-OB5, and back to the image sensor 170 to evaluate the depth information of the second image IMG2.

For example, as illustratively shown in FIG. 5C, the Illumination unit 160 may projector the light L2. Similarly, in some embodiments, the wavelength of the light L2 may be within about 700 nm to about 1 mm, which is invisible to humans.

The image sensor 170 is configured to capture and record the infrared light reflected from the objects OB1-OB5. In some embodiments, the image sensor 170 includes multiple CMOS sensors configured to detect the infrared light L3 reflected from the objects OB1-OB5. Specifically, since the distances of the objects OB1-OB5 are different, the time delays between the light projection and the time CMOS sensors receive the reflected light L3 from the objects OB1-OB5 are different. Accordingly, since the light speed is a known value, the distance of the objects OB1-OB5 may be evaluate based on the travelling time (i.e., time of flight) of the light, and the depth information of the second image IMG2 may be evaluated.

In view of above, various approaches may be applied to obtain the depth information. It is noted that the embodiments mentioned above are merely by examples and not meant to limit the present disclosure.

It is noted that the above embodiments are simplified for better understanding of the present disclosure. It should be noted that, in some embodiments, the 3D image processing method 900 may be implemented as a computer program. When the computer program is executed by a computer, an electronic device, or the processing circuit 110 in FIG. 1, this executing device performs the 3D image processing method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned 3D image processing method 900, no particular sequence is required unless otherwise specified. Moreover, the operations may also be performed simultaneously or the execution times thereof may at least partially overlap.

Furthermore, the operations of the 3D image processing method 900 may be added to, replaced, and/or eliminated as appropriate, in accordance with various embodiments of the present disclosure.

Through the operations of various embodiments described above, a 3D image processing method is implemented to reduce the throughput of the network while providing sufficient image data for the electronic device 200 to rebuild and display two different images for the left eye and the right eye of the user, in order to achieve a 3D effect in applications require a low transmission latency, such as a livestream/real-time broadcast or other real-time applications.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the scope of the appended claims should not be limited to the description of the embodiments contained herein.

What is claimed is:

1. A 3D image processing method for a camera device and a head mounted electronic device respectively having processing circuits, the head mounted electronic device further having a first screen and a second screen, the 3D image processing method comprising:
   capturing, by the camera device, a first image with a first camera and a second image with a second camera, wherein the first image and the second image are corresponding to a scene and captured with different viewing angles;
   identifying, by the processing circuit of the camera device, one or more objects or image areas in the second image;
   obtaining corresponding distance values between the camera device and the one or more objects or image areas by depth information of the second image;
   transmitting, by the camera device, the first image to the head mounted electronic device;
   transmitting, by the camera device, the one or more objects or image areas as one or more object images in the second image to the head mounted electronic device in response to the corresponding distance values between the camera device and the one or more objects or image areas being smaller than a threshold value, wherein the one or more object images are different from the corresponding pixels in the first image, and the amount of data of the one or more object images is less than the amount of data of the second image;
   not transmitting, by the camera device, portions of the second image other than the one or more object images to the head mounted electronic device;
   generating, by the processing circuit of the head mounted electronic device, a third image by replacing the corresponding pixels in the first image with the one or more object images; and
   displaying, by the head mounted electronic device, the first image and the third image respectively on the first screen and the second screen.

2. The 3D image processing method of claim 1, further comprising: applying a stereo vision method to obtain the depth information of the second image and the stereo vision method comprises:
   comparing corresponding pixels in the first image and in the second image to evaluate the depth information of the second image.

3. The 3D image processing method of claim 1, further comprising: applying a structured light method to obtain the depth information of the second image and the structured light method comprises:
   projecting, by an illumination unit of the camera device, a light with an encoded pattern to the one or more objects;
   capturing, by an image sensor of the camera device, a light coding on the one or more objects; and
   comparing the light coding with the encoded pattern to evaluate the depth information of the second image.

4. The 3D image processing method of claim 1, further comprising: applying a time of flight method to obtain the depth information of the second image and the time of flight method comprises:
   projecting, by an illumination unit of the camera device, a light to the one or more objects;
   capturing, by an image sensor of the camera device, the light reflected from the one or more objects; and
   measuring, by the image sensor of the camera device, a travelling time of the light from the illumination unit to the one or more objects and back to the image sensor to evaluate the depth information of the second image.

5. A camera device, comprising:
   a first camera and a second camera;
   a processing circuit electrically connected to the first camera and the second camera;
   a communicating circuit electrically connected to the processing circuit and configured to communicate the camera device with a head mounted electronic device that has a first screen and a second screen;
   a memory electrically connected to the processing circuit; and
   one or more programs, wherein the one or more programs are stored in the memory and configured to be executed by the processing circuit, the one or more programs comprising instructions for:
      controlling the first camera to capture a first image and controlling the second camera to capture a second image, wherein the first image and the second image are corresponding to a scene and captured with different viewing angles;
      identifying one or more objects or image areas in the second image;
      obtaining corresponding distance values between the camera device and the one or more objects or image areas by the depth information of the second image;
      controlling the communicating circuit to transmit the first image to the head mounted electronic device;
      controlling the communicating circuit to transmit the one or more objects or image areas as one or more object images in the second image to the head mounted electronic device in response to the corresponding distance values between the camera device and the one or more objects or image areas being smaller than a threshold value, wherein the one or more object images are different from the corresponding pixels in the first image, and the amount of data of the one or more object images is less than the amount of data of the second image; and
      not controlling the communicating circuit to transmit portions of the second image other than the one or more object images to the head mounted electronic device;
   wherein a third image is generated by a processing circuit of the head mounted electronic device by replacing the corresponding pixels in the first image with the one or more object images, and the first image and the third image are displayed respectively on the first screen and the second screen by the head mounted electronic device.

6. The camera device of claim 5, wherein the one or more programs further comprise instructions for:
   comparing corresponding pixels in the first image and in the second image to evaluate the depth information of the second image.

7. The camera device of claim 5, further comprising:
an illumination unit electrically connected to the processing circuit and configured to project a light with an encoded pattern to the one or more objects; and
an image sensor electrically connected to the processing circuit and configured to capture a light coding on the one or more objects;
wherein the one or more programs further comprise instructions for:
comparing the light coding with the encoded pattern to evaluate the depth information of the second image.

8. The camera device of claim 5, further comprising:
an illumination unit electrically connected to the processing circuit and configured to project a light to the one or more objects; and
an image sensor electrically connected to the processing circuit and configured to capture the light reflected from the one or more objects;
wherein the one or more programs further comprise instructions for:
controlling the image sensor to measure a travelling time of the light from the illumination unit to the one or more objects and back to the image sensor to evaluate the depth information of the second image.

9. A non-transitory computer readable storage medium storing one or more programs, comprising instructions, which when executed, causes a processing circuit of a camera device that has a first screen and a second screen to perform operations comprising:
controlling a first camera of the camera device to capture a first image and controlling a second camera of the camera device to capture a second image, wherein the first image and the second image are corresponding to a scene and captured with different viewing angles:
identifying one or more objects or image areas in the second image; obtaining corresponding distance values between the camera device and the one or more objects or image areas by the depth information of the second image;
controlling a communicating circuit of the camera device to transmit the first image to a head mounted electronic device; and
controlling the communicating circuit of the camera device to transmit the one or more objects or image areas as one or more object images in the second image to the head mounted electronic device in response to the corresponding distance values between the camera device and the one or more objects or image areas being smaller than a threshold value, and the one or more object images are different from the corresponding pixels in the first image, and the amount of data of the one or more object images is less than the amount of data of the second image; and not controlling the communicating circuit to transmit portions of the second image other than the one or more object images to the head mounted electronic device;
wherein a third image is generated by a processor circuit of the head mounted electronic device by replacing the corresponding pixels in the first image with the one or more object images, and the first image and the third image are displayed respectively on the first screen and the second screen by the head mounted electronic device.

10. The non-transitory computer readable storage medium as claimed in claim 9, further comprising instructions, which when executed, causes the processing circuit to further perform operations comprising:
comparing corresponding pixels in the first image and in the second image to evaluate the depth information of the second image.

11. The non-transitory computer readable storage medium as claimed in claim 9, further comprising instructions, which when executed, causes the processing circuit to further perform operations comprising:
controlling an illumination unit of the camera device to project a light with an encoded pattern to the one or more objects;
controlling an image sensor of the camera device to capture a light coding on the one or more objects; and
comparing the light coding with the encoded pattern to evaluate the depth information of the second image.

12. The non-transitory computer readable storage medium as claimed in claim 9, further comprising instructions, which when executed, causes the processing circuit to further perform operations comprising:
controlling an illumination unit of the camera device to project a light to the one or more objects;
controlling an image sensor of the camera device to capture the light reflected from the one or more objects; and
controlling the image sensor of the camera device to measure a travelling time of the light from the illumination unit to the one or more objects and back to the image sensor to evaluate the depth information of the second image.

* * * * *